(No Model.)

M. M. BARNES.
MICROMETER CALIPERS.

No. 280,339. Patented July 3, 1883.

WITNESSES
Joseph Ashbaugh
B. W. Williams

INVENTOR,
Merrick M. Barnes
By his Atty,
Henry W. Williams

UNITED STATES PATENT OFFICE.

MERRICK M. BARNES, OF BOSTON, MASSACHUSETTS.

MICROMETER-CALIPERS.

SPECIFICATION forming part of Letters Patent No. 280,339, dated July 3, 1883.

Application filed February 12, 1883. (No model.)

*To all whom it may concern:*

Be it known that I, MERRICK M. BARNES, of Boston, in the county of Suffolk and State of Massachusetts, have invented new and useful Improvements in Micrometer-Calipers, of which the following is a specification.

Figure 1:
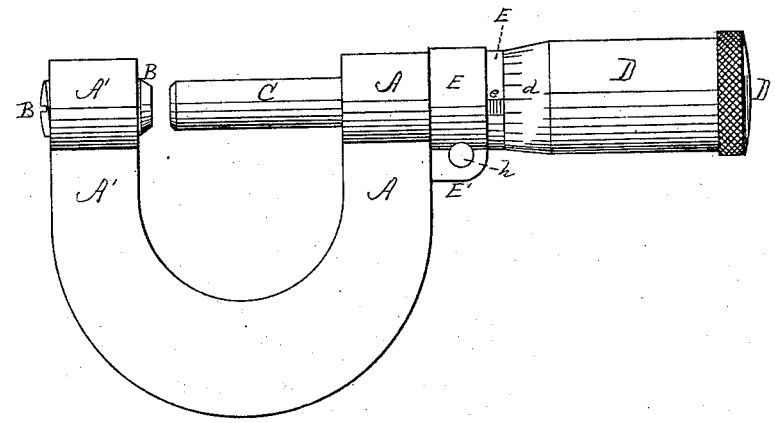
Figure 2:
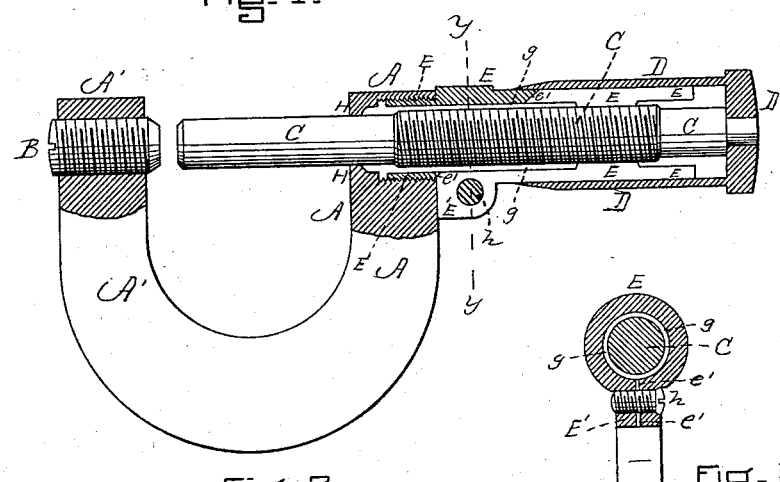
Figure 3:
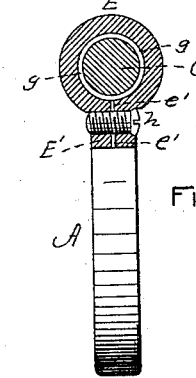

In the accompanying drawings, in which similar letters of reference indicate like parts, Figure 1 is a front elevation of my improved calipers. Fig. 2 is a longitudinal vertical section of the same. Fig. 3 is a transverse vertical section on line $y$, Fig. 2.

A and A' are the two arms of the calipers, the latter being provided with the usual adjustable screw, B.

C is the micrometer-screw, to the shank of which is rigidly secured the index-cylinder D, provided with the ordinary graduated scale, $d$.

E is the nut, provided with the scale $e$, and threaded to receive the micrometer-screw C. This nut E is bored out so as to form the annular chamber $g$ around the thread of the screw C, and is sawed longitudinally, as shown at $e'$, and provided with arms E', adapted to be drawn toward each other by the screw $h$, so that the pressure upon the micrometer-screw may be accurately adjusted, with the effect of causing the screw to turn with more or less friction. A sleeve, H, is screwed into the arm A, and fits over the plain portion of the screw C at H, so as to prevent dust, dirt, grit, &c., from coming into contact with the thread; or a sleeve or washer may be inserted at this point, if desired.

It will be noticed that in this invention the arm A of the calipers and the nut are made separate and distinct; that the portion of the nut which comes into contact with the micrometer-screw—*i. e.*, that portion in which said screw operates—is placed back from the "take-up" screw $h$, thus enabling it, by means of the annular groove $g$ and space $e'$, to be yielding and spring onto the micrometer-screw; and that the screw is supported near one end, or at its threaded portion, by the nut, and near the other end, or at its plain portion, by the arm A, thus causing the screw to be rigidly and firmly supported. This is needful, as the yielding nut requires that the screw should be supported at the other end.

Having thus fully described my invention, what I claim, and desire to secure by Letters Patent, is—

1. In micrometer-calipers, the arm A and nut in which the micrometer-screw turns, said arm and nut being made separate and supporting the screw near its opposite ends, and said arm forming at its point of support a plain bearing for the screw, applied to the portion thereof which is not threaded, substantially as and for the purpose set forth.

2. In micrometer-calipers, the combination, with the arm A, of the nut E, hollowed out at $g$, and provided with the adjusting or take-up screw $h$, situated between said arm and the portion of the nut in which the screw operates, substantially as and for the purpose described.

3. The combination of the arms A A', nut E, provided with the annular groove $g$, longitudinal saw-kerf $e'$, arms E', and adjusting-screw $h$, and the micrometer-screw C, all constructed and arranged substantially as and for the purpose set forth.

4. In micrometer-calipers, the combination, with the micrometer-screw, of a yielding supporting-nut, constructed substantially as shown, whereby a spring-pressure is produced on said screw when the nut is in position for use, for the purpose specified.

MERRICK M. BARNES.

Witnesses:
HENRY W. WILLIAMS,
JOSEPH ISHBAUGH.